T. W. HAMILL.
TIRE PROTECTOR.
APPLICATION FILED FEB. 26, 1921.
1,399,553.
Patented Dec. 6, 1921.
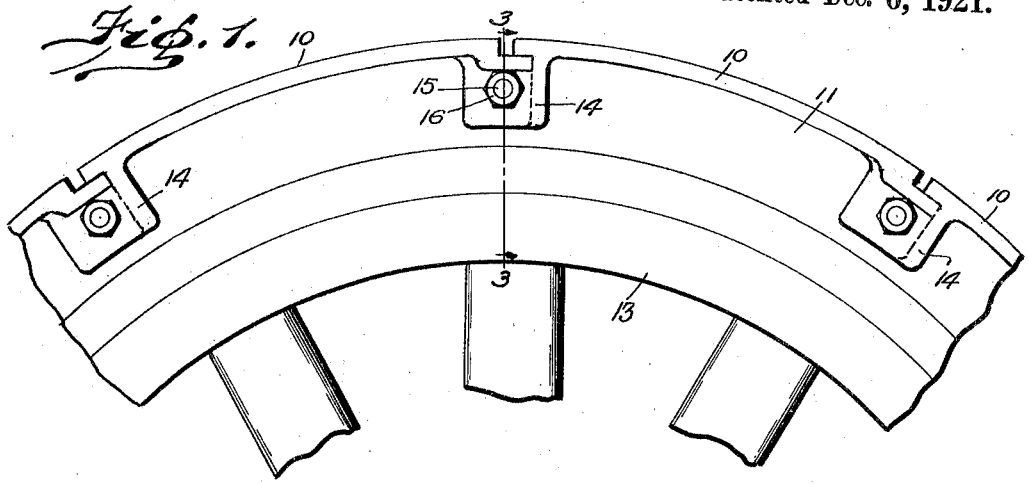
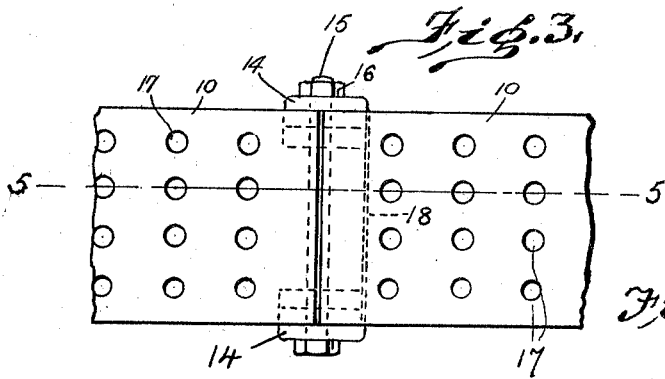
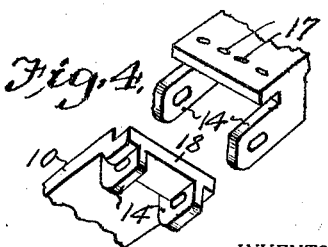
INVENTOR.
Truman W. Hamill,
BY
Geo. P. Kimmel
ATTORNEY.

UNITED STATES PATENT OFFICE.

TRUMAN WALLACE HAMILL, OF MERCED, CALIFORNIA.

TIRE-PROTECTOR.

1,399,553.

Specification of Letters Patent.

Patented Dec. 6, 1921.

Application filed February 26, 1921. Serial No. 448,025.

*To all whom it may concern:*

Be it known that I, TRUMAN WALLACE HAMILL, a citizen of the United States, residing at Merced, in the county of Merced and State of California, have invented certain new and useful Improvements in a Tire-Protector, of which the following is a specification.

This invention relates to vehicle tires, more particularly to the rubber tires, either solid or pneumatic, of motor driven vehicles, and has for one of its objects to produce an improved armor or protector for tires of this class which may be adapted without material structural change to tires of various forms and sizes, and which will effectually protect the relatively fragile material of the tire from hard substances of the road bed without interfering with its yieldableness or elasticity.

With these and other objects in view, the invention consists in certain novel features of construction as hereinafter shown and described and then specifically pointed out in the claim, and in the drawings illustrative of the preferred embodiment of the invention.

Figure 1 is a side view of a portion of a wheel felly, rim, and a solid rubber tire, with the improved armor applied.

Fig. 2 is a detached plan view of one of the armor sections.

Fig. 3 is a plan view of the contiguous portions of a pair of the armor sections.

Fig. 4 is a perspective view of the contiguous portions of a pair of the armor sections, to illustrate the construction more fully, one of the sections viewed from above and the other from beneath.

The improved armor device comprises a plurality of plates 10 of any suitable tough metal, curved longitudinally to correspond to and engage entirely around the outer face of a wheel tire, a portion of which is represented at 11, with the inner faces of the sections likewise conforming to the transverse contour of the tire.

Solid rubber tires of this class are usually received in a channeled rim, represented at 12, the latter supported upon the felly 13 as shown in Figs. 1 and 3.

The armor sections 10 are provided at their ends with overlapping ears or lugs 14, the ears being attached to the tire by transverse fastening devices, such as bolts 15, which pass through both sets of the ears and the body of the tire. While ordinary bolts 15 and nuts 16 are shown, for the purpose of illustration, for attaching the armor sections to the tires, rivets, keys or other fastening devices may be employed for this purpose, if preferred.

The outer faces of the sections 10 are provided with numerous depressions or cavities 17 to engage the road bed over which the vehicle passes, to materially increase the grip of the armor upon the road and correspondingly increase the non-skidding effect.

The contiguous ends of the sections are spaced for a considerable distance, as shown, to allow for contraction and expansion and to permit the requisite yieldableness when the wheel is under pressure by the load of the vehicle and also when running over rough roads.

Each of the sections, will be formed with a protruding lip 18 to extend beneath the adjacent part of the next section, as illustrated in Figs. 1 and 4 to form a continuous bearing entirely around the tire.

The improved device is thus readily adapted upon either solid or pneumatic tires of rubber or other light yieldable material, to prevent the surface of the tire from being worn or broken by contact with rough surfaces or road beds, and likewise protects the tire from puncturing or cutting or breakage during ordinary use. The improved device is likewise applicable to tires used upon ordinary horse drawn vehicles or trucks.

Where the tire sections of the ordinary length when combined and applied to a tire, do not fit the circumference of the tire, sections of shorter lengths may be employed, as will be obvious between the terminal sections of ordinary length.

The armor section not only protects the tire, but likewise effectually prevents skidding when running over wet or soft roads.

When the tire provided with the improved armor device is subjected to lateral strain, the ears 14 together with the fastening devices hold the tire from lateral displacement, thus causing all the vibrations and wearing to be borne by the wearing surface of the armor section.

The armor sections can be constructed of iron or steel or compositions of metals of a tough, hard, yet light flexible composition, which will withstand general hard wear, with the surfaces of the sections tempered to suit the condition of the road bed.

The sections may be of any required length, and specifically curved to conform to the circumference of the tire or tire casing. The sections may be increased or decreased in thickness to conform to the strains to which they will be subjected. For instance when employed upon trucks for hauling heavy loads, the section must be thicker than when employed on lighter vehicles or passenger carrying vehicles.

The preferred embodiment of the invention is disclosed in the drawing and set forth in the specification, but it will be understood that any modifications within the scope of the claim may be made in the construction without departing from the principle of the invention or sacrificing any of the advantages.

What I claim is:

A tire armor comprising a plurality of sections curved longitudinally to correspond to the curvature of the tire and each depressed at one end to form a seat sunken below the outer line of the section, perforated ears depending below the seat portion and spaced from the side edges of the section and perforated ears depending below the section at the other end and extending in advance of the same, the outer faces of the last mentioned ears being flush with the side edges of the sections, whereby when a plurality of the sections are disposed end to end around a tire with the ears interlapping and supplied with pintle devices, the unrecessed ends will engage in the seats of the section next in advance and produce a continuous line of sections, and the sections supported from deflection at their junctures.

In testimony whereof, I affix my signature hereto.

TRUMAN WALLACE HAMILL.